(No Model.)
P. EMMENEGGER.
PICTURE FRAME.
No. 599,774.  Patented Mar. 1, 1898.
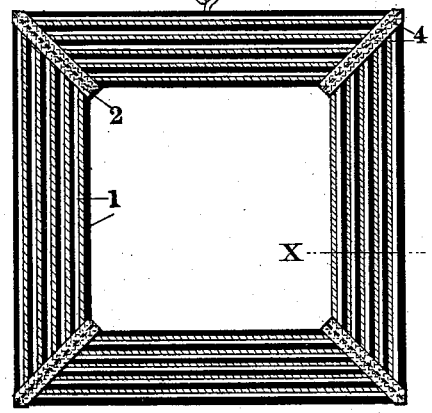
FIG. 1
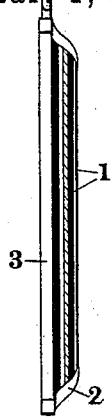
FIG. 2
FIG. 3
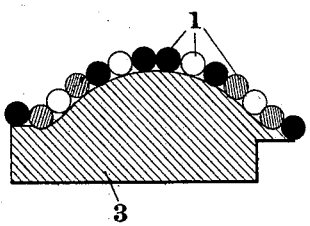
FIG. 4
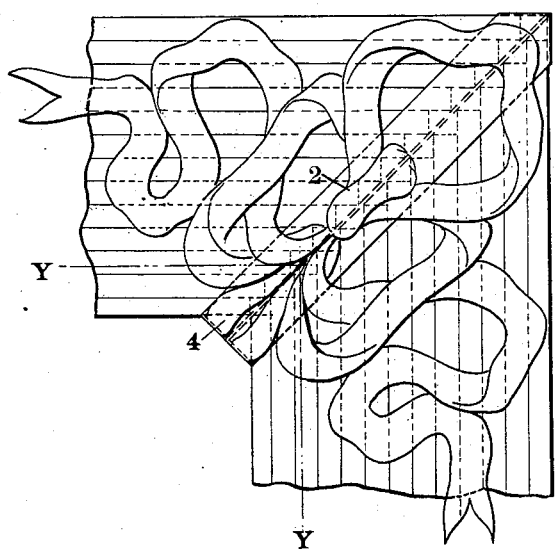
FIG. 5
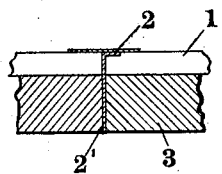
WITNESSES
Geo. F. Edmiston
R. W. McCulloch
INVENTOR
Peter Emmenegger
BY Meltzer & Co.,
his ATT'YS.
THE NORRIS PETERS CO., PHOTO-LITHO., WASHINGTON, D. C.

UNITED STATES PATENT OFFICE.

PETER EMMENEGGER, OF FAIRMONT, WEST VIRGINIA.

PICTURE-FRAME.

SPECIFICATION forming part of Letters Patent No. 599,774, dated March 1, 1898.

Application filed October 23, 1897. Serial No. 656,119. (No model.)

*To all whom it may concern:*

Be it known that I, PETER EMMENEGGER, a citizen of the Republic of Switzerland, residing at Fairmont, in the county of Marion and State of West Virginia, have invented a new and useful Improvement in Picture-Frames, of which the following is a specification.

My invention relates to picture-frames, and has particular reference to the ornamentation of same.

Its main object is to make the ornamental surface of a frame of glass rods arranged to resemble molding, and thus providing an outer surface for the frame which is not subject to be changed in appearance by the action of the atmosphere and not liable to be marred.

My invention and the manner in which I put same into practice will be understood from the following description, with reference to the accompanying drawings, in which—

Figure 1 is a front view of a picture-frame constructed according to my invention. Fig. 2 is a side or end view of same. Fig. 3 is an enlarged section on the line $x\,x$ of Fig. 1. Fig. 4 is a detail view of one corner of the frame, showing an ornamental exterior on the connecting member 2''. Fig. 5 is a section on the line $y\,y$ of Fig. 4.

The frame shown consists of a back piece 3, of wood. Upon the front of this a plurality of glass rods 1 are placed, as better seen by reference to Fig. 3. These rods are preferably of different colors or shades, as indicated by the black, hatched, and white rods shown, the same being made of different-stained glass. The rods are made of different lengths, meeting at the corners of the frame, where a filling of cement 4 connects the ends across the corners of the frame. Over this cement a band 2 is fastened, which is preferably of metal. I prefer to provide also a rib 2', which is fastened to the under side of the band 2, extending down between the members of the frame, across the corners, and through the cement. The purpose of the ribs 2' is to prevent the lateral movement of the bands 2, holding same firmly in position. It will be seen that a very beautiful frame may be constructed in this way, which will permanently retain its original appearance.

The rods are made of glass having the coloring-matter embodied in the material, so that their appearance is in no way altered by heat or cold or by the action of the atmosphere.

It is plain that the manner of connecting the rods as well as their position on the frame may be altered without departing from the spirit of my invention, and I do not therefore confine myself to the connection nor to the position shown.

The advantage of having the rods in separate series for each arm of the frame is in the economy of construction, thus making it necessary only to cut the rods to different lengths for different sizes of frames.

What I claim as my invention, and desire to secure by Letters Patent, is—

1. A picture-frame comprising a frame 3; a plurality of glass rods arranged thereon in separate series along each arm of the frame, forming the face of the frame; and bands connecting the adjoining ends of the rods at the corners of the frame, and each having a rib secured to its inside and fastened in the frame 3; substantially as described.

2. A picture-frame comprising a frame 3; a plurality of glass rods arranged thereon in separate parallel series along each arm of the frame, forming the face of the frame; and bands connecting the adjoining ends of the rods at the corners of the frame, and each having a rib secured to its inside and fastened in the frame 3; substantially as described.

3. A picture-frame comprising a frame 3; a plurality of glass rods arranged thereon in separate series, forming the face of the frame; bands overlapping the ends of the rods; cement interposed between said ends and under said bands; and a rib secured to the inside of each of said bands, and seated in the cement; substantially as described.

4. A picture-frame comprising a frame 3; a plurality of glass rods arranged thereon in separate parallel series, forming the face of the frame; bands overlapping the ends of the rods; cement interposed between said ends and under said bands; and a rib secured to the inside of each of said bands, and seated in cement; substantially as described.

PETER EMMENEGGER.

Witnesses:
WM. T. TRACY,
ALEX. HUMPHREY.